United States Patent [19]
Kurihara et al.

[11] Patent Number: 5,341,642
[45] Date of Patent: Aug. 30, 1994

[54] SYSTEM FOR DIAGNOSING ENGINE EXHAUST GAS PURIFYING DEVICE AND SYSTEM FOR DIAGNOSING SENSOR

[75] Inventors: Nobuo Kurihara, Hitachiota; Toshio Ishii, Mito; Takashi Mukaihira, Katsuta; Kazuya Kawano, Katsuta; Yutaka Takaku, Katsuta, all of Japan

[73] Assignee: Hitachi, Ltd., Japan

[21] Appl. No.: 994,344

[22] Filed: Dec. 21, 1992

[30] Foreign Application Priority Data

Dec. 20, 1991 [JP] Japan .................. 3-338220

[51] Int. Cl.⁵ .............................................. F01N 3/28
[52] U.S. Cl. ........................................ 60/276; 60/277
[58] Field of Search .......................... 60/274, 276, 277

[56] References Cited

U.S. PATENT DOCUMENTS

| | | | |
|---|---|---|---|
| 5,063,901 | 11/1991 | Kaneyasu et al. | 123/419 |
| 5,129,379 | 7/1992 | Kaneyasu et al. | 123/436 |
| 5,140,961 | 8/1992 | Sawamoto et al. | 123/419 |
| 5,144,560 | 9/1992 | Kurihara et al. | 364/431.04 |
| 5,154,054 | 10/1992 | Nakane et al. | 60/277 |
| 5,191,762 | 3/1993 | Kuroda et al. | 60/277 |

FOREIGN PATENT DOCUMENTS

2-30915 2/1990 Japan .
3-249320 11/1991 Japan .

*Primary Examiner*—Noah P. Kamen
*Attorney, Agent, or Firm*—Evenson, McKeown, Edwards & Lenahan

[57] ABSTRACT

A system which is capable of diagnosing the deterioration condition of an engine exhaust gas purifying device has front and rear air/fuel ratio sensors for detecting the air/fuel ratio of the exhaust gas upstream and downstream of the catalyst, an autocorrelation function calculation for calculating the autocorrelation function $\phi xx$ of an output signal from the front air/fuel ratio sensor to output the maximum values $(\phi xx)max$ of the autocorrelation function $\phi xx$ at predetermined intervals, each maximum value $(\phi xx)max$ being in each of the predetermined intervals. A cross-correlation function calculator calculates the cross-correlation function $\phi xy$ between the output signals from the front and rear air/fuel ratio sensors to output the maximum values $(\phi xy)max$ of the mutual correlation function $\phi xy$ at predetermined intervals, each maximum value $(\phi xy)max$ being in each of the predetermined intervals therefore. The ratios between the maximum values $(\phi xy)max$ and $(\phi xx)max$ (successive deterioration index $\Phi_i$) are calculated to determine the deterioration condition of the catalyst by comparing the ratio with a predetermined reference value.

18 Claims, 5 Drawing Sheets

SYSTEM FOR DIAGNOSING ENGINE EXHAUST GAS PURIFYING DEVICE AND SYSTEM FOR DIAGNOSING SENSOR

BACKGROUND OF THE INVENTION

1. Field of the Invention

The present invention relates to a system for diagnosing an engine exhaust gas purifying device using a catalytic converter and an air/fuel ratio or oxygen concentration (hereinafter also referred to as air/fuel ratio) sensor.

2. Description of the Related Art

A device for purifying an exhaust gas from an engine mainly comprises a catalytic converter and an air/fuel ratio feedback (closed-loop) control unit. The catalytic converter is disposed in an exhaust manifold for eliminating HC, NOx and CO from the exhaust gas. It is necessary to keep the air/fuel ratio constant in order to sufficiently perform the function of the catalytic converter. Accordingly, an oxygen sensor is disposed upstream of the catalytic converter so that the air/fuel ratio feedback control unit controls the fuel supply quantity to provide a desired air/fuel ratio.

When the performance of the oxygen sensor provided upstream of the catalytic converter deteriorates in a usual three-way catalyst of the above mentioned prior art, the air/fuel ratio does not fall into a narrow range around the stoichiometric air/fuel ratio, resulting in a reduction in conversion efficiency of harmful components. When the performance of the catalytic converter per se deteriorates, the conversion efficiency of harmful components falls even if the air/fuel ratio is accurately controlled.

In order to solve this problem, it is necessary to determine the deterioration condition of the catalyst. However, no diagnosing system which is capable of diagnosing the performance deterioration during operation of an engine and taking fast countermeasure has been established.

Such a technology for determining the deterioration of the catalyst includes, for example, an apparatus for determining the deterioration of a catalyst for an internal combustion engine as is disclosed in Japanese Unexamined Patent Publication Tokkai-Hei 2-3091. In this apparatus, oxygen sensors are provided in the front and rear of a catalytic converter for measuring a time difference between the time when the output of the front oxygen sensor is inverted and the time when the output of the rear sensor is inverted. Deteriorated condition of the catalyst is determined based upon the measured time difference. Specifically, it is determined that the catalyst has deteriorated if the time difference is short.

SUMMARY OF THE INVENTION

The present invention was made in order to overcome the above mentioned problem of the prior art.

It is therefore an object of the present invention to provide a system for and method of diagnosing an engine exhaust gas purifying device which is capable of diagnosing the deteriorated condition of air/fuel ratio sensors or oxygen sensors and a catalytic converter during operation of an engine.

In an aspect of the present invention, there is provided a system for diagnosing the deteriorated condition of an engine exhaust gas purifying device, that is used to purify with a catalyst an exhaust gas from an engine having an air/fuel ratio control unit for adjusting the air injection quantity, by detecting the concentration of the oxygen or the air/fuel ratio in the exhaust gas so that a constant air/fuel ratio in the exhaust gas is maintained, comprising: a front air/fuel ratio sensor for detecting the oxygen concentration or the air/fuel ratio in the exhaust gas prior to the purification thereof with the catalyst; a rear air/fuel ratio sensor for detecting the oxygen concentration or the air/fuel ratio in the exhaust gas after the purification thereof with the catalyst; feature wave form extracting means for attenuating signals in a frequency band lower than the air/fuel ratio control frequency band of the air/fuel ratio control unit in signal outputs from the front and rear air/fuel ratio sensors; correlation function calculating means for calculating the correlation function of the signal which has passed through the feature wave form extracting means; and catalyst condition determining means for determining the deterioration condition of the catalyst based upon the value of the correlation function, whereby the condition of the engine exhaust gas purifying device is diagnosed from the deterioration condition of the catalyst which was determined by the catalyst condition determining means.

The correlation function calculating means preferably includes:

autocorrelation function calculating means for calculating and outputting the autocorrelation function $\phi xx$ of a signal derived from the front air/fuel ratio sensor from among signals output from the feature wave form extracting means; cross-correlation function calculating means for calculating and outputting the cross-correlation function $\phi xy$ representing the cross-correlation between the signals derived from the front air/fuel ratio sensor output from the feature wave form extracting means and the signals derived from the rear air/fuel ratio sensor output from the feature wave form extracting means; and deterioration index calculating means for outputting the ratio between a value of the cross-correlation function $\phi xy$ and a value of the autocorrelation function $\phi xy$ as a successive deterioration index $\Phi_i$; the catalyst condition determining means having a preset reference value and being capable of determining the deterioration condition of the catalyst by comparing the reference value with the successive deterioration index $\Phi_i$.

The deterioration index calculating means preferably outputs as the successive deterioration index $\Phi_i$ at predetermined intervals the ratio between the maximum value $(\phi xy)max$ of the cross-correlation function $\phi xy$ in the predetermined interval and the maximum value $(\phi xx)max$ of the autocorrelation function $\phi xx$ in the interval.

The deterioration index calculating means preferably has the capability of calculating the average value of a given number of successive deterioration indices $\Phi_i$ which have been calculated at intervals and outputting the average value as a final deterioration index.

The catalyst condition determining means preferably determines the deterioration condition of the catalyst by comparing the reference value with the final deterioration index with which the successive deterioration index $\Phi_i$ is replaced.

The system may further include engine operating condition detecting means for detecting the engine speed and/or the temperature of the catalyst.

The deterioration index calculating means preferably calculates the final deterioration index by using the detection result from the operating condition detecting means as coefficients.

The feature wave form extracting means preferably includes a high pass filter.

The feature wave form extracting means preferably includes a band pass filter.

The system may further include crank angle detecting means for detecting that an engine crank is at a predetermined angle.

The correlation function calculating means preferably calculates the correlation function by using data which are output from the front and rear air/fuel ratio sensors at the time when the crank angle detecting means detects that the crank is at the predetermined crank angle.

The system preferably further includes sensor condition determining means having a preset second reference value for determining the deterioration condition of the front air/fuel ratio sensor by comparing the value of the autocorrelation function $\phi xx$ with the second reference value.

In another aspect of the present invention, there is provided a system for diagnosing the condition of a sensor having a response characteristic of the output signal which changes with the change in the condition of the sensor per se, comprising autocorrelation function calculating means for calculating and outputting the autocorrelation function $\phi xx$ of the output signal from the sensor; and sensor condition determining means having a preset reference value for determining the condition of the sensor by comparing the value of said autocorrelation function $\phi xx$ with the preset reference value.

The system further includes sensor condition index calculating means which calculates at predetermined intervals the maximum value $(\phi xx)max$ of the autocorrelation function $\phi xx$ in the predetermined interval for calculating the average value of a given number of previous maximum values $(\phi xx)max$ and for outputting the average value as a sensor condition index.

The sensor condition determining means preferably determines the condition of the sensor by comparing the sensor condition index with the reference value.

The system of a control unit for feedback controlling an object which is detected by the sensor in accordance with the detection result of the sensor may further include feature wave form extracting means for attenuating signals in a frequency band lower than the control frequency band of the control among the output signals from the sensor.

The autocorrelation function calculating means preferably calculates the autocorrelation function $\phi xx$ from the signal which has passed the feature wave form extracting means.

The autocorrelation function calculating means preferably calculates the autocorrelation function $\phi xx$ by using data obtained at predetermined intervals from among the data obtained by the sensor.

In a further aspect of the present invention, there is provided a method of diagnosing the condition of an engine exhaust gas purifying device for purifying an exhaust gas with a catalyst, comprising: calculating the ratio of: the maximum value $(\phi xx)max$ of the autocorrelation function $\phi xx$ of measurement data of the air/fuel ratio of the exhaust gas prior to the purification thereof with the catalyst to: the maximum value $(\phi xy)max$ of the cross-correlation function $\phi xy$ between the measurement data of the air/fuel ratio of the exhaust gas prior to the purification thereof with the catalyst and the measurement data of the air/fuel ratio of the exhaust gas after the purification thereof with the catalyst; and determining the catalyst deterioration condition by comparing the ratio with a predetermined reference value for diagnosing the condition of the engine exhaust gas purifying device based upon a result of the determination.

In a further aspect of the present invention there is provided a method of diagnosing the condition of a sensor having a response characteristic which changes with the change in the conditions of the sensor per se, comprising: calculating the maximum value $(\phi xx)max$ of the autocorrelation function $\phi xx$ of the output signal from the sensor at predetermined intervals; and diagnosing the condition of a sensor by comparing the maximum value $(\phi xx)max$ with a reference value.

The front and rear air/fuel ratio sensors detect the oxygen concentration or the air/fuel ratio of the exhaust gas before and after the treatment with the catalyst, respectively and outputs them. The feature wave form extracting means attenuates the signals having frequencies lower than the air/fuel ratio control frequency of the air/fuel ratio control unit from these output signals.

The autocorrelation function calculating means calculates and outputs the autocorrelation function $\phi xx$ of the signal which has passed through the feature wave form extracting means. On the other hand, cross-correlation function calculating means calculates and outputs the cross-correlation function $\phi xy$ between the output signals from the front and rear air/fuel sensors, which have passed through the feature wave form extracting means.

The deterioration index calculating means calculates the ratio between the maximum value $(\phi xy)max$ of the cross-correlation function $\phi xy$ in a predetermined interval and the maximum value $(\phi xx)max$ of the autocorrelation function $\phi xx$ in the predetermined interval and provides successive deterioration indices $\Phi_i$ in the predetermined intervals and calculates the average value of a given number of previous successive deterioration indices $\Phi_i$ and outputs it as a final deterioration index. In this case, the deterioration index calculating means may calculate the final deterioration index by using the detection result of the operating condition detecting means as a coefficient.

The catalyst condition determining means compares the successive deterioration indices $\Phi_i$ or the final deterioration index with the predetermined reference value to determine the deterioration condition of the catalyst.

Another aspect of the present invention will be described.

The feature wave form extracting means attenuates the signals in a frequency band lower than the control frequency band of the control unit from the output signals output from the sensor.

The autocorrelation function calculating means calculates the autocorrelation function $\phi xx$ of the signal which has passed through the feature wave form extracting means and outputs at predetermined intervals the maximum value $(\phi xx)max$ of the autocorrelation function $\phi xx$ at a predetermined interval.

The sensor condition index calculating means calculates the average value of a number of previous maximum values $(\phi xx)max$ and outputs it as a sensor condition index.

The sensor condition determining means compares the maximum values ($\phi xx$)max or the sensor condition indices with the predetermined reference value at predetermined intervals to determine the sensor condition.

DESCRIPTION OF EMBODIMENTS

One embodiment of the present invention will be described with reference to drawings.

Firstly, the concept of the present embodiment will be described.

A diagnosing system in the present embodiment is used for a device comprising a catalytic converter 2, a front $O_2$ sensor 3 and a rear $O_2$ sensor 4 which are deposited at front and rear of the catalytic converter 2, respectively, as air/fuel sensors, and a fuel injection control means 7 for feedback controlling the air/fuel ratio based upon the outputs of the $O_2$ sensors 3 and 4.

The front and rear $O_2$ sensors 3 and 4 which include zirconium, titania, etc. are used in the present embodiment as air/fuel ratio sensors. Hydrocarbon sensors may be used as the air/fuel ratio sensors. Some hydrocarbon sensors that may be used measure the absorption factor of infra-red rays.

Now, control of the system to which the diagnosing system of the present invention is applied will be described.

The fuel injection control means 7 comprises fuel injection quantity calculating means 9, output means 10 and air/fuel ratio feedback calculating means 8. The fuel injection quantity calculating means 9 determines the basic fuel-injection quantity $F_0$ from a value detected by a sensor 5 for detecting the load imposed upon an engine (for example, an intake air/fuel quantity Qa) and a value detected by a sensor 6 for detecting the engine speed Ne in accordance with the following equation 1.

$$F_0 = k_0 Qa/Ne \quad (1)$$

wherein $F_0$ denotes the basic fuel injection quantity; Qa denote the intake air quantity; and Ne denotes the engine speed. On the other hand, the air/fuel ratio feedback calculating means 8 samples the output of the air/fuel ratio sensor 3 (hereinafter referred to as "front $O_2$ sensor") which is provided upstream of the catalytic converter 2 at predetermined intervals for generating a correction signal $\alpha$ depending upon the detection value from the sensor 3.

The fuel injection quantity calculating means 9 determines the injection quantity F from the basic fuel injection quantity $F_0$ in accordance with equation 2 in consideration of the correction signal $\alpha$. The thus determined fuel injection quantity is converted into a voltage duty signal by the output means 10 and is then applied to a fuel injector.

$$F = k_0 Qa/Ne \cdot (1+\alpha) \quad (2)$$

wherein F denotes the fuel injection quantity; Qa denotes the intake air quantity; Ne denotes the engine speed; and $\alpha$ denotes the correction signal which is increased or decreased if the oxygen concentration in the exhaust gas in high or low, respectively.

The air/fuel ratio upstream of the catalytic converter 2 constantly varies around the stoichiometric value by such a control.

The diagnosing system of the present embodiment uses the variation of the air/fuel ratio which occurs by the feedback control of the air/fuel ratio as a test signal for the diagnosis of deterioration of the catalytic converter, etc. If the catalytic converter 2 does not deteriorate, there is less variation of the air/fuel ratio downstream of the catalytic converter 2 caused by the oxidation and reduction of the catalyst. If the catalytic converter 2 deteriorates, the variation of the air/fuel ratio downstream of the catalytic converter 2 becomes similar to that upstream thereof since HC, NOx and the like pass through the catalytic converter 2 without being treated. In such a manner, deterioration of the catalytic converter is diagnosed based upon the similarity of the variation of the air/fuel ratio upstream of the catalytic converter to that downstream thereof.

A feature of the present invention is that deterioration diagnosing means 11 is provided for evaluating the similarity in accordance with a correlation function.

The deterioration diagnosing means 11 includes feature wave form extracting means 12 which firstly eliminates from the outputs from the front and rear $O_2$ sensors 3 and 4 components which are not directly related with the deterioration of the catalytic converter 2 such as a d.c. component, that is, a component which may cause errors when an operation using the correlation function is performed.

The feature wave form extracting means 12 is preferably a differential filter, high pass filter or band pass filter. Signals derived from the front and rear $O_2$ sensors 3 and 4 will be hereinafter represented by characters x and y, respectively.

The autocorrelation function $\phi xx$ of the output signal from the front $O_2$ sensor 3 is calculated in accordance with equation 3 by an autocorrelation function calculating means 13. The cross-correlation function $\phi xy$ between the output signal x of the front $O_2$ sensor 3 and an output signal y of the rear $O_2$ sensor 4 is calculated in accordance with equation 4 by the cross-correlation function calculating means 14.

$$\phi xx(\tau) = \int x(t)x(t-\tau)dt \quad (3)$$

$$\phi xy(\tau) = \int x(t)y(t-\tau)dt \quad (4)$$

The maximum value ($\phi xy$)/max of $\phi xy$ and the maximum value ($\phi xx$)max of $\phi xx$ are determined by changing the phase $\tau$ in an integration region (O to T) of the correlation function. Deterioration of the catalytic converter 2 and the front $O_2$ sensor is determined by using these values.

Determination of whether or not the catalytic converter 2 has deteriorated is made by catalytic converter deterioration determining means 16, which calculates a successive deterioration index $\Phi_i$ in accordance with equation 5 and compares the calculated index with a predetermined reference value.

$$\Phi_i = (\phi xy)max/(\phi xx)max \quad (5)$$

If the catalyst deteriorates, the successive deterioration index $\Phi_i$ increases (approaches to 1) since there is an increase in similarity between the variations of the air/fuel ratio upstream and downstream of the catalytic converter 2.

Figure 4:
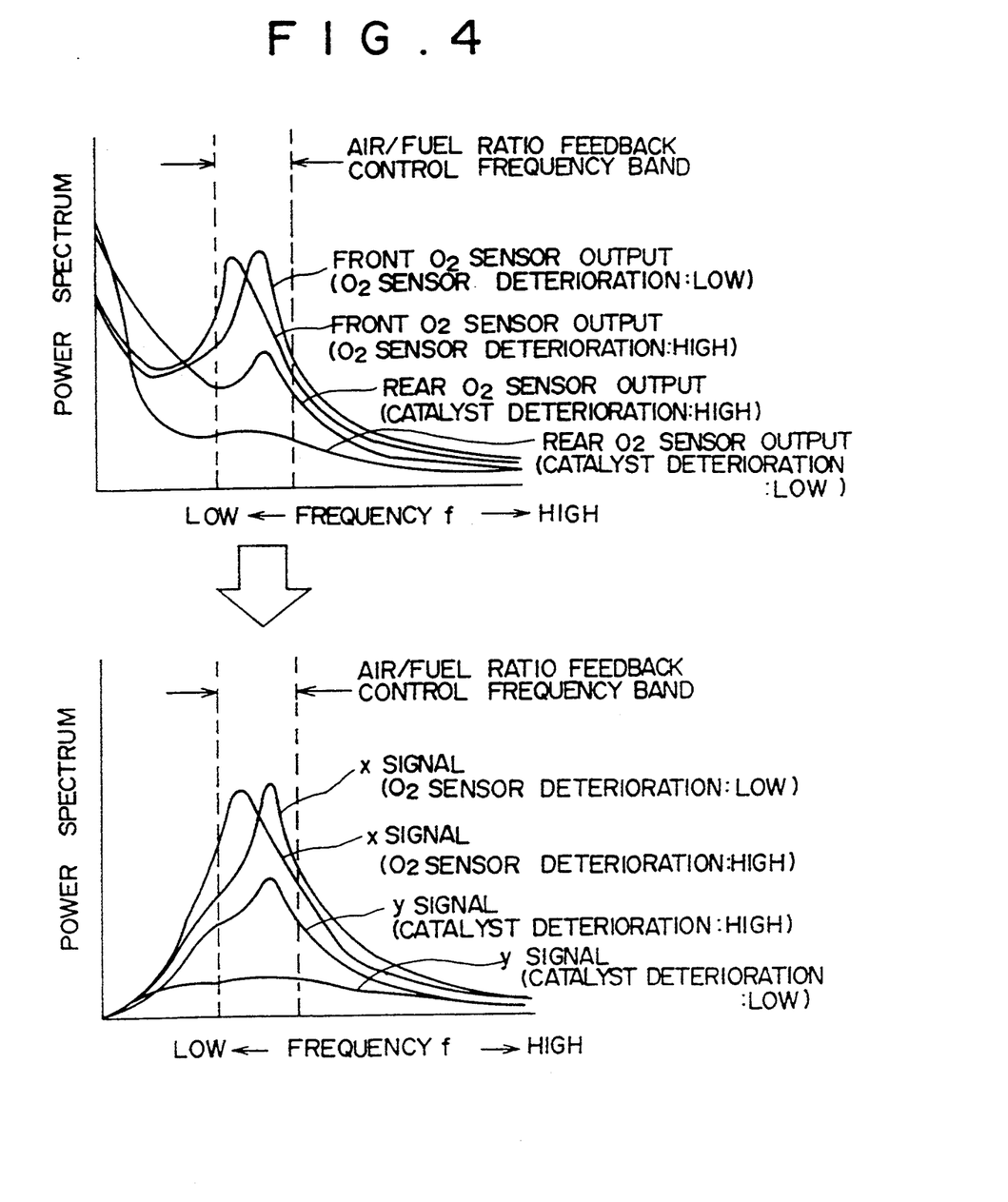
FIG. 4 are graphs of a power spectra plotted against frequency, illustrating the operation of the feature wave form extraction.
Figure 5:
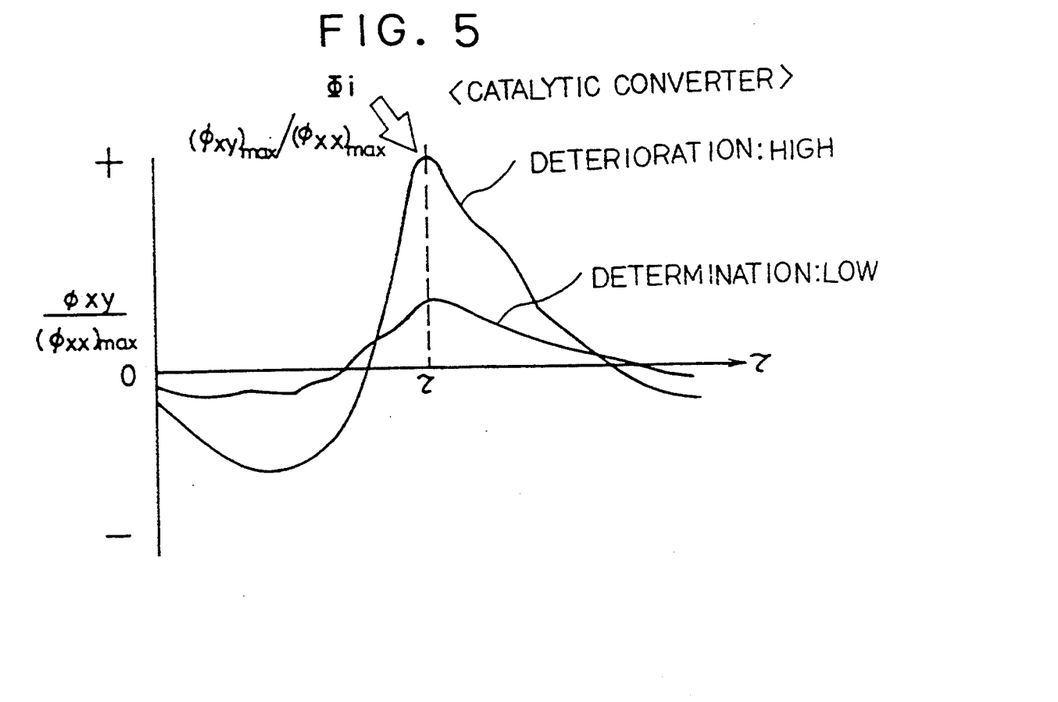
FIG. 5 is a characteristic graph illustrating the determination of the catalytic converter deterioration.

On the other hand, determination as to whether or not the front $O_2$ sensor 3 deteriorates is made by air/fuel ratio sensor deterioration determining means 15, which determines the deterioration of the front $O_2$ sensor by using $(\phi xx)max$ as the deterioration index. If the front $O_2$ sensor 3 deteriorates, the maximum value $(\phi xx)max$ becomes lower since the response of the sensor 3 is delayed. Accordingly, deterioration can be detected by comparing the monitored maximum value with a predetermined reference value. The power spectra of the output of the front $O_2$ sensor 3 before and after the deterioration thereof for frequency are shown in FIG. 4. It is understood that the peaks of the spectra are shifted to the low frequency side and the response speed is slow when the sensor deteriorates.

The diagnosing system in the present embodiment will be more specifically described.

The diagnosing apparatus per se mainly comprises a single chip microcomputer having an A/D converter therein, and a high pass filter although other types of processors and filter are contemplated.

Figure 1:
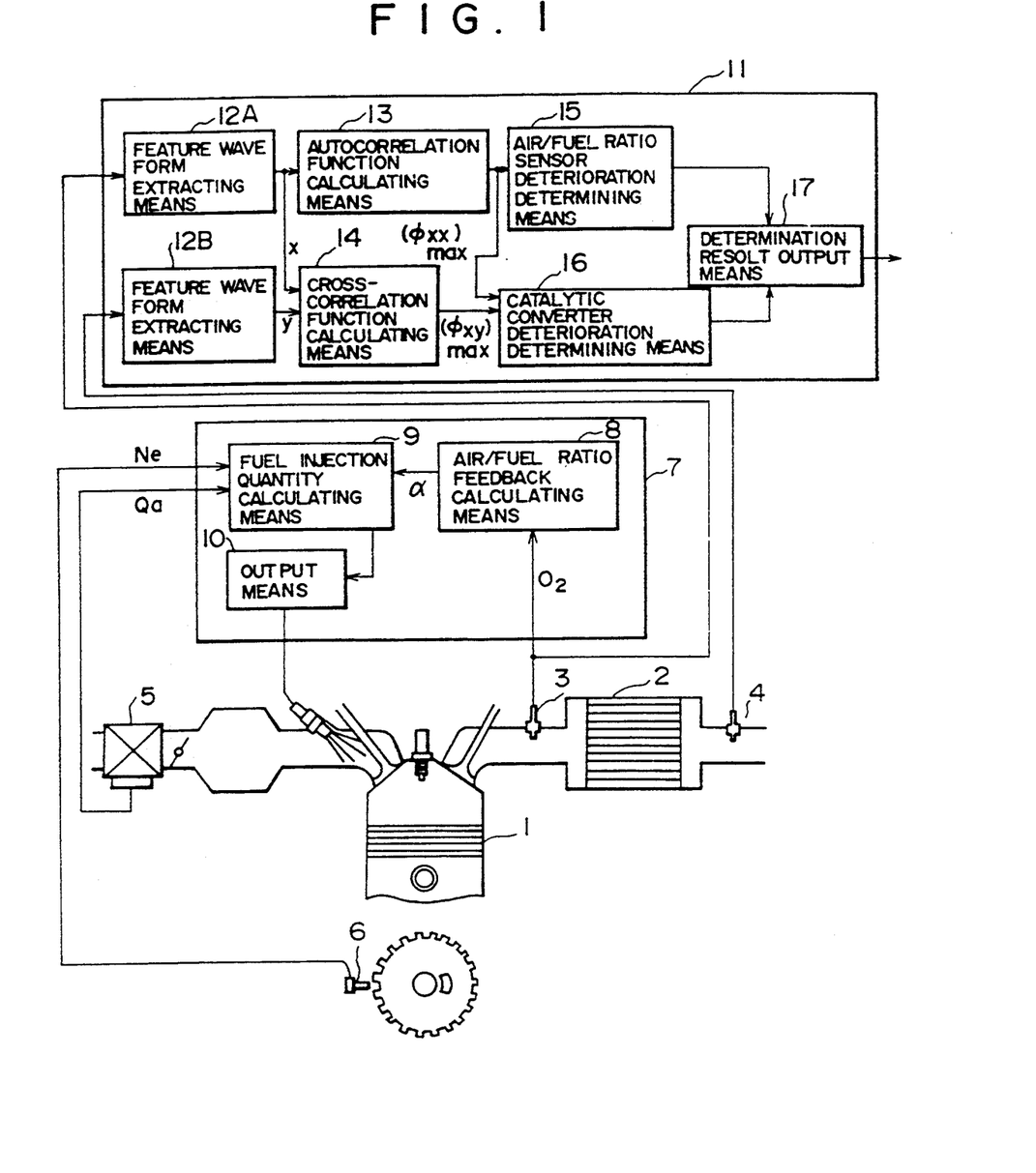
FIG. 1 is a block diagram showing the configuration of an embodiment of the present invention.

The high pass filter corresponds to the feature wave form extracting means 12A and 12B in FIG. 1.

The microcomputer is operated in accordance with stored software for achieving functions of the above mentioned means such as autocorrelation function calculating means 13 and the catalytic converter deterioration determining means 16.

It is to be understood that the configuration of the hardware of the present invention is not limited to only the above mentioned configuration.

Figure 2:
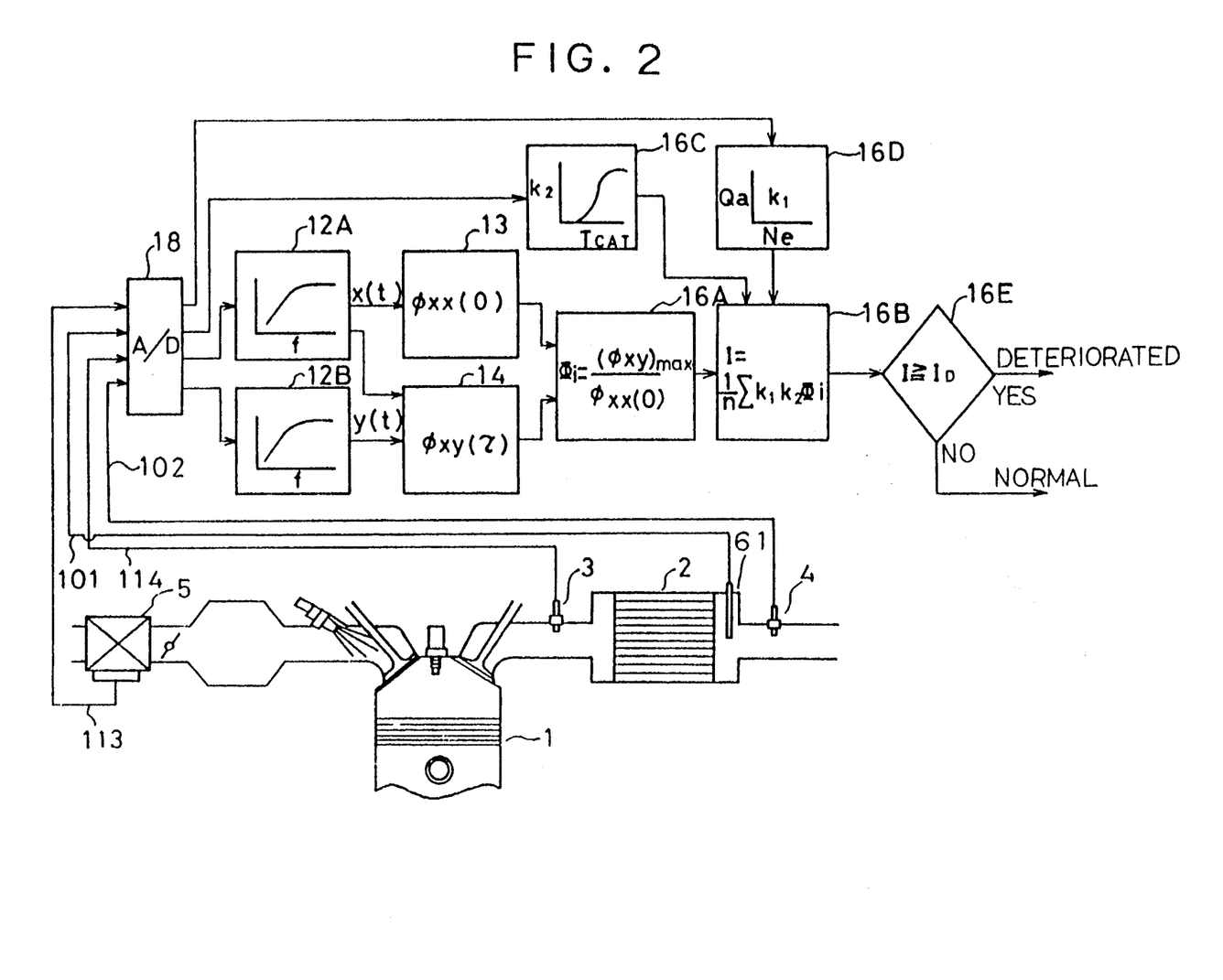
FIG. 2 is a block diagram showing the operation of the present embodiment.

Operation of the diagnosing system will be described with reference to FIG. 2. In the drawing, components in blocks which perform functions similar to those in FIG. 1 are represented by like reference numerals.

Operation for determining whether or not the catalytic converter 2 deteriorates will be described.

An output signal 114 of the front $O_2$ sensor 3 hereinafter referred to as "front $O_2$ sensor signal" and an output signal 102 of the rear $O_2$ sensor 4 hereinafter referred to as "rear $O_2$ sensor signal" are converted into digital data by an A/D converter 18 in synchronization with each other.

Figure 3:
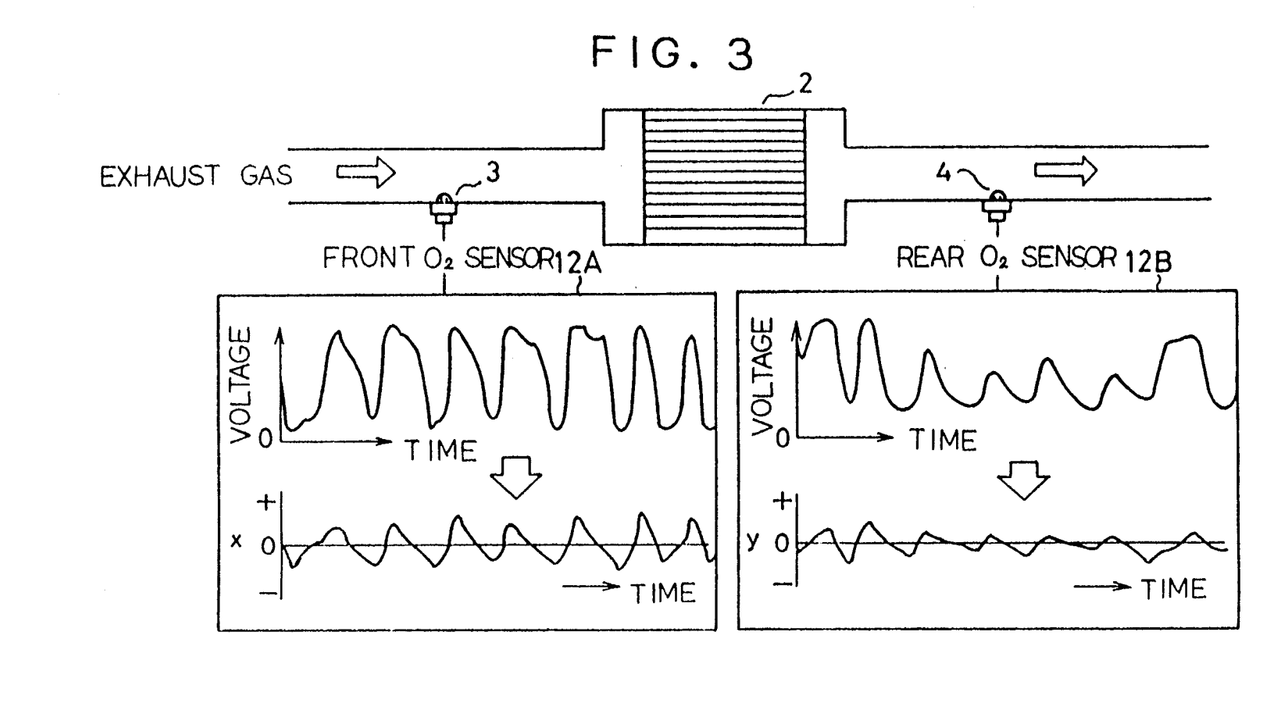
FIG. 3 is a diagram illustrating feature wave form extraction in the present embodiment.

Direct current components which will become disturbances for the diagnosis are eliminated from respective signals by high pass filters (blocks 12A and 12B). Both filters (12A and 12B) have the same characteristics. Examples of the feature wave form extraction are shown in FIG. 3. Although the d.c. components included in the voltage signal of the $O_2$ sensors are eliminated, the control period is preserved. The power spectra of these signals for frequency are shown in FIG. 4. Components having frequencies lower than the frequency of the air/fuel ratio feedback control which will cause a disturbance for the diagnosis are eliminated from both signals.

Although only the low frequency components are eliminated in the present embodiment, components having frequencies higher than the frequency of the air/fuel ratio feedback control may be eliminated by using band pass filters as mentioned above. In this case, it is possible to perform a more accurate determination since the frequency band which is used for the calculation of the correlation function falls into only a frequency band having a given width including the frequency of the air/fuel ratio feedback control. Feedback control of the air/fuel ratio is usually conducted at a period of 0.5 to 2 seconds.

Subsequently the autocorrelation function $\phi xx$ of a signal x(t) 105 obtained from the front $O_2$ sensor signal 114 at a point $\tau = 0$ is determined (block 13). The reason why $\phi xx(o)$ is determined at this point is that the autocorrelation function $\phi xx$ assumes the maximum value $(\phi xx)max$ at $\tau = 0$.

The cross-correlation function $\phi xy(\tau)$ is obtained from the signals x(t) and y(t) which are obtained from the front and rear $O_2$ sensor signals 114 and 102, respectively in a predetermined integration region T (block 14). The integration region T is preliminarily preset so that the variation of the engine speed will not exceed a given range in that region. The reason for this is that accurate diagnosis can not be conducted during high acceleration or deceleration.

The maximum value $(\phi xy)max$ of $\phi xy(\tau)$ in the integration region T is searched and the successive deterioration index $\Phi_i$ $(=(\phi xy)max/\phi xx(0)$, refer to equation 5) is calculated by using the max. $\Phi_i$ is obtained by actually retrieving data since the phase $\tau$ of the successive deterioration index $\Phi_i$, that is, the phase $\tau$ at which $(\phi xy)/\phi xx(0)$ assumes the maximum value varies with the operating conditions and vehicle model.

$\Phi_i$ is stored in a memory (RAM). $\Phi_{i+1}$ is also determined in next integration region T by similar processing.

The average value of $\Phi_i$ is determined by repeating the above mentioned operation. The determined average value is made a final deterioration index I of the catalytic converter 2. The final deterioration index I is calculated also in consideration of correction coefficients $k_1$ and $k_2$ depending upon various operating conditions (block 16B, 16C and 16D and refer to equation (6).

$$I = (\Sigma k_1 k_2 \Phi_i)/n \quad (6)$$

wherein I denotes the final deterioration index; $k_1$ denotes the correction coefficient depending upon the engine load; $k_2$ denotes the correction coefficient depending upon the catalyst temperature; $\Phi_i$ denotes the successive deterioration index; and n denotes the number of measurements.

The value of successive deterioration index $\Phi_i$ tends to increase as the load upon the engine increases. Accordingly, in order to correct this, $k_1$ is decreased with the increase in the load. Conversely, $k_1$ is increased with the decrease in the load.

The value of successive deterioration index tends to decrease as the catalyst temperature is elevated. Accordingly, in order to correct this, $k_2$ is increased as the catalyst temperature is elevated and conversely, $k_2$ is decreased as the catalyst temperature is lowered.

$k_1$ and $k_2$ are preliminarily stored in a memory (ROM) as map data. The temperature of the catalyst is detected by a temperature sensor 61. The load can be determined from the values detected by the sensors 5, 6 and the like.

Subsequently, the deterioration condition is determined by comparing the final deterioration index I with a predetermined deterioration determination level $I_D$. If the final deterioration index I is larger than the deterioration determination level $I_D$, it is determined that the catalyst has deteriorated (block 16E).

Figure 6:
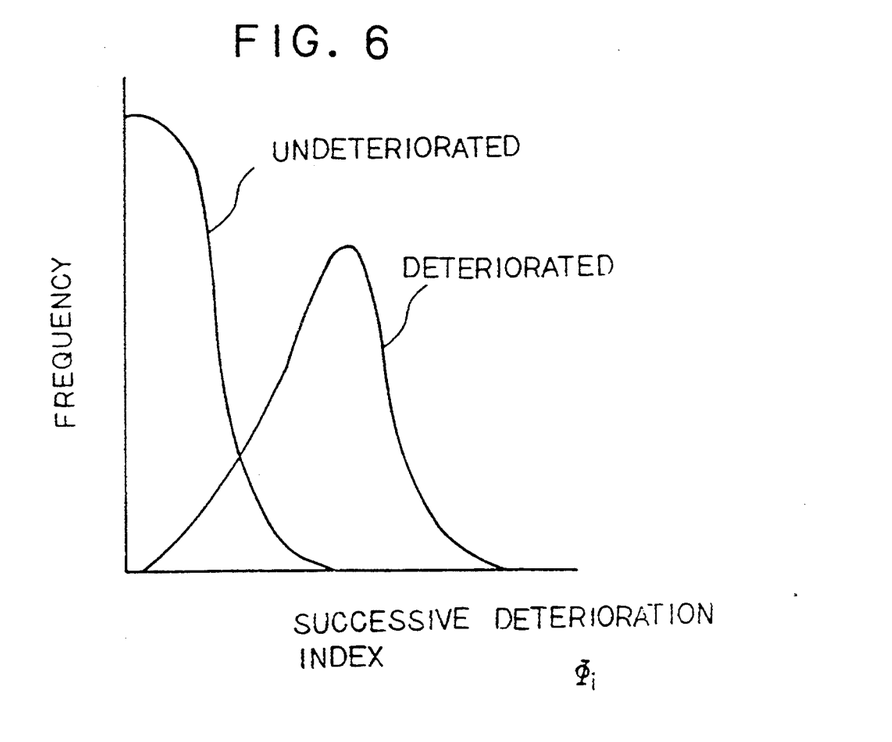
FIG. 6 is a characteristic graph illustrating the determination of the catalytic converter deterioration.

The reason why the average value of the successive deterioration indices $\Phi_i$, that is, final deterioration index I is used without using the successive deterioration indices $\Phi_i$ is that the successive deterioration indices $\Phi_i$ are changed due to the influences of the changes in the engine speed and the load as shown in FIG. 6 during operation. In other words, each of the successive deterioration indices $\Phi_i$ for a given engine speed or a given load is determined so that the determined indices $\Phi_i$ are accumulated. The average value of the accumulated indices $\Phi_i$ is made the final deterioration index I. This makes it possible to determine the deterioration over an entire range of operation. However, if the operating condition is restricted to some extent (for example, steady operation is performed), determination may be made by using the successive deterioration indices $\Phi_i$.

Determination as to whether or not the front $O_2$ sensor 3 deteriorates will be described.

This determination is made based upon only the autocorrelation function $\phi xx$ of the front $O_2$ sensor signal. The autocorrelation function assumes the maximum value $(\phi xx)max$ at $\tau=0$ as mentioned above. The maximum value $(\phi xx)max$ decreases as the front $O_2$ sensor 3 deteriorates. This is due to the fact that the response characteristic of the $O_2$ sensor used in the present embodiment is adversely affected as the deterioration proceeds.

Accordingly, deterioration of the front $O_2$ sensor 3 can be detected by detecting the maximum value $(\phi xx)max$ and by comparing it with a predetermined reference value.

If components having frequencies lower than the frequency of the air/fuel ratio feedback control are eliminated from the data which are used for determining the autocorrelation function $\phi xx$ similarly to the case of determination of the catalytic converter, the errors can be reduced.

The power spectra before and after the elimination of the low frequency components are shown in FIG. 4.

Although the maximum value $(\phi xx)max$ is directly used, the average value of the maximum value $(\phi xx)max$ may be used for the determination as similarly to the case in which deterioration of the catalytic converter 2 is determined by using the final deterioration index I.

Having described the front $O_2$ sensor 3 which may readily deteriorate, the above mentioned determining operation may be also applicable to the rear $O_2$ sensor 4. This operation is also widely applicable to the other various sensors whose response characteristic may change due to deterioration or any other reason.

Sampling of data from the front and rear $O_2$ sensors 3 and 4 may be conducted at predetermined intervals. Alternatively, the sampling may be conducted at predetermined crank angles which are detected by a sensor for detecting the crank angle of the engine. It is preferable to perform the calculation of the correlation function, etc. by using data output from the sensors 3 and 4 at the predetermined crank angle for determining whether or not the catalytic converter 2 deteriorates. This is due to the fact that the frequency of the air/fuel ratio feedback control is changed depending upon the engine speed although the components having frequencies lower than the air/fuel ratio feedback control are eliminated as mentioned above for determining the deterioration of the catalytic converter 2. In other words, no correction is necessary since sampling is not influenced by the change in the engine speed if sampling is conducted at predetermined crank angles. In contrast to this, correction is necessary if data which are output at predetermined intervals are used. On the other hand, the deterioration characteristic of the front $O_2$ sensor 3 depends upon only the condition of the sensor 3 per se and is not influenced by the engine speed. It is preferable to calculate the autocorrelation function by using data which are obtained at predetermined intervals for determining the deterioration of the front $O_2$ sensor 3 since the time $\tau$ is directly used for the data processing.

In the above mentioned embodiments, deterioration of the catalytic converter which purifies the exhaust gas from the engine and the air/fuel ratio sensors (oxygen sensors in the present embodiment) can be diagnosed during normal operation of the engine. Since the correlation function is used for the determination of the similarity of signals, the present invention provides a higher immunity from noise than an apparatus which uses frequency, amplitude, etc. and provides a higher accuracy by eliminating disturbance components by means of a filter, etc.

As mentioned above, in accordance with the present invention deterioration of a catalytic converter which purifies exhaust gas from an engine and a sensor can be diagnosed during normal running of a vehicle.

What is claimed is:

1. A system for diagnosing an engine exhaust gas purifying device for purifying with a catalyst an exhaust gas from an engine having an air/fuel ratio control unit for adjusting the fuel injection quantity by detecting the concentration of the oxygen or the air/fuel ratio in the exhaust gas so that a constant air/fuel ratio in the exhaust gas is maintained, comprising:

a front air/fuel ratio sensor for detecting the oxygen concentration or the air/fuel ratio in the exhaust gas prior to the purification thereof with said catalyst;

a rear air/fuel ratio sensor for detecting the oxygen concentration or the air/fuel ratio in the exhaust gas after the purification thereof with said catalyst;

feature wave form extracting means for attenuating signals in a frequency band lower than the air/fuel ratio control frequency band of said air/fuel ratio control unit in signal outputs from said front and rear air/fuel ratio sensors;

correlation function calculating means for calculating the correlation function of said signal which has passed through said feature wave form extracting means; and catalyst condition determining means for determining the deterioration condition of said catalyst based upon the value of said correlation function, whereby the engine exhaust gas purifying device is diagnosed from the deterioration condition of the catalyst which was determined by said catalyst condition determining means.

2. A system for diagnosing an engine exhaust gas purifying device as defined in claim 1 in which said correlation function calculating means includes:

autocorrelation function calculating means for calculating and outputting the autocorrelation function $\phi xx$ of a signal derived from said front air/fuel ratio sensor among signals output from said feature wave form extracting means;

cross-correlation function calculating means for calculating and outputting the cross-correlation function $\phi xy$ representing the cross-correlation between the signals derived from said front air/fuel ratio sensor output from said feature wave form extracting means and the signals derived from said rear air/fuel ratio sensor output from said feature wave form extracting means; and deterioration index calculating means for outputting the ratio between a value of said cross-correlation function $\phi xy$ and a value of said autocorrelation function $\phi xx$ as a successive deterioration index $\Phi_i$;

said catalyst condition determining means having a preset reference value and being capable of determining the deterioration condition of said catalyst by comparing said reference value with said successive deterioration index $\Phi_i$.

3. A system for diagnosing an engine exhaust gas purifying device as defined in claim 2 in which said deterioration index calculating means outputs as the successive deterioration index $\Phi_i$ at predetermined intervals the ratio between the maximum value $(\phi xy)max$ of said cross-correlation function $\phi xy$ in said predetermined interval and the maximum value $(\phi xx)max$ of the autocorrelation function $\phi xx$ in said interval.

4. A system for diagnosing an engine exhaust gas purifying device as defined in claim 2 in which said deterioration index calculating means has the capability of calculating the average value of a given number of said successive deterioration indices $\Phi_i$ which have been calculated at said intervals and outputting the average value as a final deterioration index;

said catalyst condition determining means being adapted to determine the deterioration condition of the catalyst by comparing said reference value with said final deterioration index with which said successive deterioration index $\Phi_i$ is replaced.

5. A system for diagnosing an engine exhaust gas purifying device as defined in claim 4 and further including engine operating condition detecting means for detecting the engine speed and/or the temperature of said catalyst, said deterioration index calculating means being adapted to calculate said final deterioration index by using the detection result from said operating condition detecting means as coefficients.

6. A system for diagnosing an engine exhaust gas purifying device as defined in claim 1 in which said feature wave form extracting means includes a high pass filter.

7. A system for diagnosing an engine exhaust gas purifying device as defined in claim I in which said feature wave form extracting means includes a band pass filter.

8. A system for diagnosing an engine exhaust gas purifying device as defined in claim 1 and further including crank angle detecting means for detecting that an engine crank is at a predetermined angle, said correlation function calculating means being adapted to calculate said correlation function by using data which are output from said front and rear air/fuel ratio sensors at the time when said crank angle detecting means detects that the crank is at said predetermined crank angle.

9. A system for diagnosing an engine exhaust gas purifying device as defined-in claim 2 and-further including sensor condition determining means having a preset second reference value for determining the deterioration condition of said front air/fuel ratio sensor by comparing the value of said autocorrelation function $\phi xx$ with the second reference value.

10. A system for diagnosing a sensor in an apparatus having a response characteristic of the output signal which changes with the change in the condition of the sensor per se, comprising;

feature wave form extracting means for attenuating signals in a frequency band lower than a control frequency band among the output signals from said sensor;

autocorrelation function calculating means for calculating and outputting the autocorrelation function $\phi xx$ of the output signal from said sensor, said autocorrelation function calculating means being adapted to calculate the autocorrelation function $\phi xx$ from the signal which has passed said feature wave form extracting means, by using data obtained at predetermined intervals among the data obtained by said sensor;

sensor condition determining means having a preset reference value for determining the condition of said sensor by comparing the value of said autocorrelation function $\phi xx$ with said preset reference value; and means for feedback controlling the apparatus having a condition detected by said sensor in accordance with the detection result of said sensor.

11. A system for diagnosing as defined in claim 10 and further including sensor condition index calculating means which calculates at predetermined intervals the maximum value $(\phi xx)max$ of said autocorrelation function $\phi xx$ in said predetermined interval for calculating the average value of a given number of previous maximum values $(\phi xx)max$ and for outputting the average value as a sensor condition index;

said sensor condition determining means being adapted to determine the condition of said sensor by comparing said sensor condition index with said reference value.

12. A system for diagnosing an engine exhaust gas purifying device as defined in claim 10 in which said feature wave form extracting means includes a high pass filter.

13. A system for diagnosing an engine exhaust gas purifying device as defined in claim 10 in which said feature wave form extracting means includes a band pass filter.

14. A system for diagnosing an engine exhaust gas purifying device for purifying with a catalyst an exhaust gas from an engine having an air/fuel ratio control unit for adjusting the fuel injection quantity by detecting the concentration of the oxygen or the air/fuel ratio in the exhaust gas so that a constant air/fuel ratio in the exhaust gas is maintained, comprising:

a first sensor having a response characteristic of an output signal which changes with a change in the condition of the first sensor per se, said first sensor detecting oxygen concentration or air/fuel ratio in the exhaust gas at least one of prior to and after the purification of the exhaust gas with the catalyst;

a second sensor that detects oxygen concentration or air/fuel ratio in the exhaust gas at least one of prior to and after the purification of the exhaust gas with the catalyst;

a processor that receives output signals from the first and second sensors, determines the deterioration condition of the catalyst from the output signals from the first and second sensors, generates signals during determination of the deterioration condition of the catalyst, and determines the condition of the first sensor based upon said generated signals.

15. A system for diagnosing an engine exhaust gas purifying device for purifying with a catalyst an exhaust gas from an engine having an air/fuel ratio control unit for adjusting the fuel injection quantity by detecting the concentration of the oxygen or the air/fuel ratio in the exhaust gas so that a constant air/fuel ratio in the exhaust gas is maintained, comprising:
- a front air/fuel ratio sensor for detecting the oxygen concentration or the air/fuel ratio in the exhaust gas prior to the purification thereof with said catalyst;
- a rear air/fuel ratio sensor for detecting the oxygen concentration or the air/fuel ratio in the exhaust gas after the purification thereof with said catalyst;
- a processor coupled to receive output signals from the front and rear air/fuel ratio sensors, said processor determining the deterioration condition of the catalyst and diagnosing the engine exhaust gas purifying device based upon said deterioration condition of the catalyst, the processor including: at least one feature wave form extraction that attenuates signals in a frequency band lower than the air/fuel ratio control frequency band of the air/fuel ratio control unit in signal outputs from the front and rear air/fuel ratio sensors; and a correlation function calculator that calculates a correlation function of the signal which has passed through the feature wave form extractor.

16. The system of claim 15, wherein the feature wave form extractor includes a high pass filter.

17. The system of claim 15, wherein the feature wave form extractor includes a band pass filter.

18. The system of claim 15, further comprising an analog to digital converter coupled to the front and rear air/fuel ratio sensors and that converts analog output signals from the front and rear air/fuel ratio sensors into digital signals for processing by the processor.

* * * * *